(12) United States Patent
Lauter et al.

(10) Patent No.: US 7,743,253 B2
(45) Date of Patent: Jun. 22, 2010

(54) DIGITAL SIGNATURE FOR NETWORK CODING

(75) Inventors: Kristin E. Lauter, La Jolla, CA (US); Denis X Charles, Redmond, WA (US); Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1100 days.

(21) Appl. No.: 11/267,096

(22) Filed: Nov. 4, 2005

(65) Prior Publication Data

US 2007/0118746 A1   May 24, 2007

(51) Int. Cl.
H04L 9/32 (2006.01)
(52) U.S. Cl. ...................................... 713/170
(58) Field of Classification Search .................. 713/170
See application file for complete search history.

(56) References Cited

U.S. PATENT DOCUMENTS 7,397,916 B2* 7/2008 Johnson et al. ............... 380/28
2006/0282677 A1* 12/2006 Rodriguez et al. .......... 713/181

FOREIGN PATENT DOCUMENTS

| EP | 0752786 A1 | 1/1997 |
|---|---|---|
| WO | WO03052630 A2 | 6/2003 |
| WO | WO03061287 A1 | 7/2003 |

OTHER PUBLICATIONS

PCT International Search Report & Written Opinion for Application No. PCT/US2006/042750 mailed on Mar. 16, 2007 10 pages.

Jain, Kamal et al., "Building Scalable and Robust Peer-to-Peet Overlay Networks for Broadcasting using Network Coding", POCD 2003, Jul. 17-20, 2003, Las Vegas, NV, 9 pages.
Krohn, Maxwell N. et al., "On-the-Fly Verification of Rateless Erasure Codes for Efficient Content Distribution", 15 pages.
Balasubramanian, R. et al., "The Improbability That an Elliptic Curve Has Subexponential Discrete Log Problem under the Menezes-Okamoto-Vanstone Algorithm", Journal of Crytology, 1998, 5 pages.
Chou, Philip A., "Practical Network Coding", 10 pages.
Charles, Denis et al., "Signature for Network Coding", 8 pages.
Boneh, Dan et al., "Short Signatures from the Weil Pairing", 20 pages.
Agashe, Amod et al., "Constructing elliptic curves with a know number of points over a prime field", 14 pages.

* cited by examiner

Primary Examiner—Kambiz Zand
Assistant Examiner—Stephen Sanders
(74) Attorney, Agent, or Firm—Lee & Hayes, PLLC

(57) ABSTRACT

Digital signatures for network coding are described. In one aspect, digital signatures for network coding are described. In one aspect, segmented blocks of content for distribution are digitally signed using homomorphic digital signatures generated from an elliptic curve. A linear combination of packets comprising the digitally signed content is distributed to a destination device according to an implemented distribution scheme. The linear combination of packets includes public information when digitally signing the segmented blocks. The homomorphic digital signatures and the public information allow a device receiving one or more packets of the linear combination of packets to verify and authenticate content associated with the one of our packets independent of secure transmission of secret keys and hash digests used to digitally sign the one or more packets.

18 Claims, 3 Drawing Sheets

DIGITAL SIGNATURE FOR NETWORK CODING

BACKGROUND

Increased network bandwidth has allowed distribution of large amounts and types of media content on the internet. Peer to peer networks handle the problem of broadcasting data from a single source to multiple receivers on the network by allowing intermediate nodes to also send data. To transmit a large file, conventional distribution systems will typically segment the file into smaller portions for transmission. The problem with such a scheme is that bandwidth utilization need not be optimal as there could be bottlenecks upstream. Network coding used in conjunction with large-scale content distribution mechanisms address this problem. Network coding allows all nodes in a network to do local coding of incoming data. This has been shown to yield optimal network capacity utilization both theoretically and practically. However, up until this point, any consideration of distributing content with network coding has lacked real world applicability because of security issues. For example, conventional network coding systems and techniques do not allow for authentication and verification of transmitted data.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, digital signatures for network coding are described. In one aspect, segmented blocks of content for distribution are digitally signed using homomorphic digital signatures generated from an elliptic curve. A linear combination of packets comprising the digitally signed content is distributed to a destination device according to an implemented distribution scheme. The linear combination of packets includes public information when digitally signing the segmented blocks. The homomorphic digital signatures and the public information allow a device receiving one or more packets of the linear combination of packets to verify and authenticate content associated with the one of our packets independent of secure transmission of secret keys and hash digests used to digitally sign the one or more packets.

BRIEF DESCRIPTION OF THE DRAWINGS

In the Figures, the left-most digit of a component reference number identifies the particular Figure in which the component first appears.

DETAILED DESCRIPTION

Overview

Figure 1:
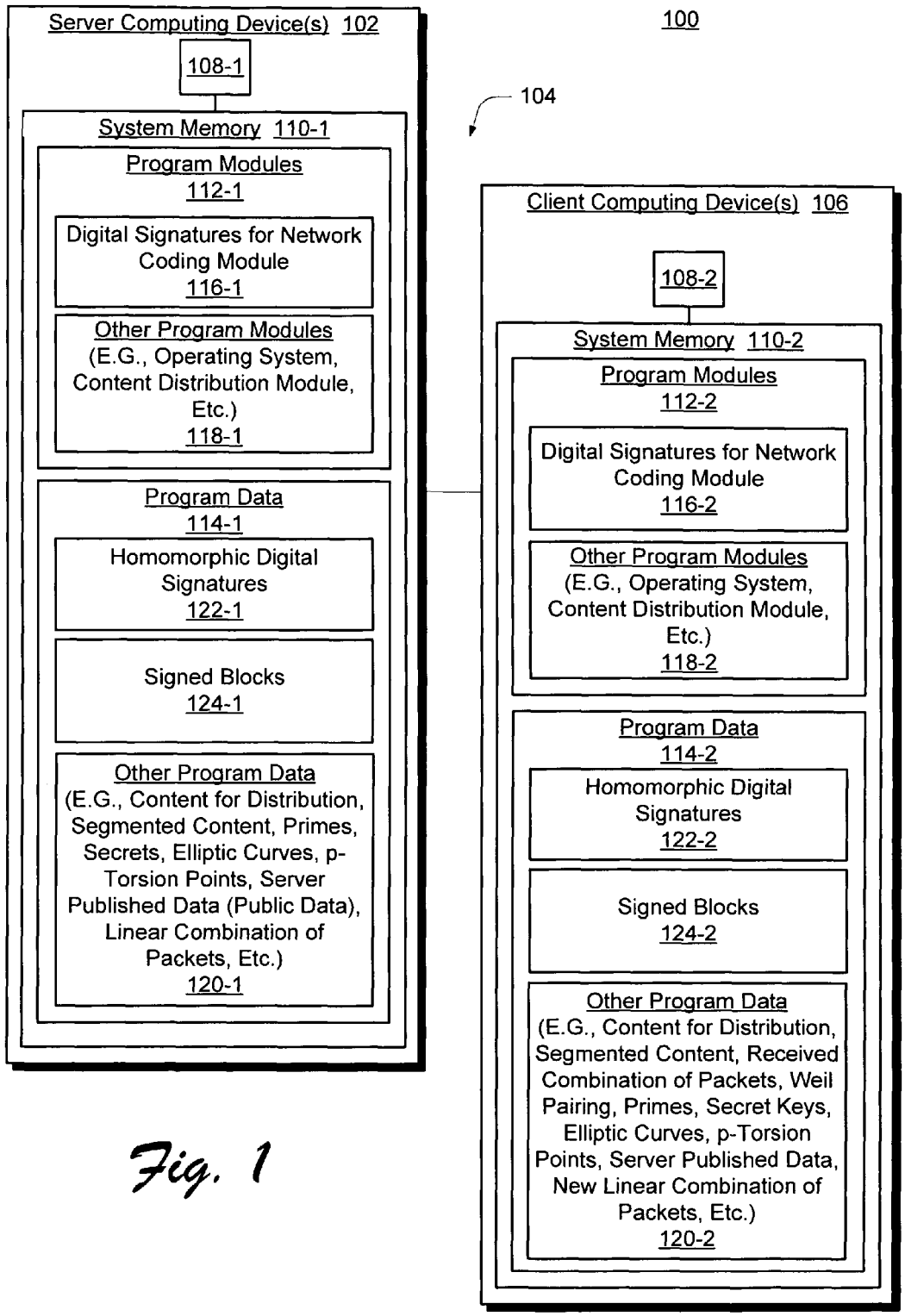
FIG. 1 illustrates an exemplary system utilizing digital signatures when distributing content based on a network coding distribution scheme, according to one embodiment.

Systems (e.g., systems, apparatus, computer-readable media, etc.) and methods for digital signatures for network coding are described below in reference to FIGS. 1-3. These systems and methods address the above described security problems and other existing security limitations of using network coding to distribute content in a distribution network. To these ends, the systems and methods utilize homomorphic hashing in network coding operations. Given a hash function for which finding collisions is computationally infeasible and linear, the systems and methods compute the hash of a linear combination of the input messages in view of the hash values of the inputs. The computed hash is utilized in a signature scheme based on the theory of elliptic curves to determine whether a message has been altered or if garbage was inserted into the message. Knowing signatures of some messages, the systems and methods sign a linear combination of the messages. The signature scheme is homomorphic, which means that a linear combination of signatures is the same as the signature of the linear combination. This allows the systems and methods to immediately detect malicious nodes that inject garbage into the network (i.e., pollution attacks) and add authentication to the network coding scheme.

The systems and methods for digital signatures in network coding are secure assuming that the discrete-log problem on elliptic curves is hard (a common assumption in cryptography). The systems and methods achieve the same level of security of that of homomorphic hashing by working over smaller fields to provide a performance advantage over other schemes for a same level of security. The security is efficiently implemented utilizing local computation.

In view of the above, the systems and methods for digital signatures in network coding, knowing signatures of some file(s) for distribution, produces signature(s) of any linear combination of the file(s). This allows a data recipient to sign packets combined at various nodes in the network without contacting the data source to sign the packets. This means that the systems and methods do not need secure transmission of the hash digests for distributed vectors. The signatures allow authentication of the data. Additionally, small bit lengths are enough to guarantee security, essentially because there are no known (general) sub-exponential algorithms for discrete logs on the group of points on elliptic curves over finite fields.

These and other aspects of the systems and methods for digital signatures in network coding are now described in greater detail.

An Exemplary System

Although not required, the systems and methods for digital signatures for network coding are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system 100 for digital signatures in network coding, according to one embodiment. In this implementation, system 100 represents a content distribution system. System 100 includes one or more server computing devices 102 coupled across a network 104 to any number of client computing devices 106. Server 102 implements operations to digitally sign content and distribute the signed content as a linear combination of packets to a client device 106 using network coding operations. Responsive to receiving the linear combination of packets, a client device 106 verifies and authenticates the digitally signed content embedded in the received packets. If client 106 verifies received contents, and if the client 106 is not the final destination within system 104 for the received content, client 106 implements operations to digitally sign the received content and distribute the verified and newly signed content as a new linear combination of packets to a different client 106 using network coding operations. In view of the above, depending on whether a respective computing device 102 and 106 is a final destination for any received digitally signed content within system 100, each computing device 102 and 106 may perform one or more of operations to digitally sign and distribute content using network coding and verify and authenticate received content.

Referring to FIG. 1, each server 102 and client computing device 106 includes one or more respective processors 108 (e.g., 108-1 and 108-2) coupled to a respective system memory 110 (e.g., 110-1 and 110-2). A system memory 110 includes computer-program modules 112 (e.g., 112-1 and 112-2) and program data 114 (e.g., 114-1 and 114-2). A processor 108 fetches and executes computer-program instructions from respective ones of the program modules 112. Program modules 112 include digital signatures for network coding module 116 (e.g., 116-1 and 116-2) and other program modules 118 (e.g., 118-1 and 118-2) such as an operating system, a content distribution model, etc. Digital signatures for network coding module ("coding module") 116 includes program logic for secure and reliable distribution of content between respective server(s) 102 and client(s) 106 across network 104. For purposes of exemplary illustration, content for distribution is shown as respective portion of "other program data" 120 (e.g., 120-1 and 120-2). That is, a coding module 116 performs one or more operations to distribute content to a client device 106 using digital signatures in network coding and verify and authenticate received digitally signed content.

In this example, coding module 116-1 of server 102 initially segments content for distribution into smaller blocks of data. These block segments are shown as respective portions of segmented content in "other data" 120-1. Server 102 computes a respective homomorphic digital signature 122-1 for each of block segment using a digital signature scheme, and signs the block segment with the respective signature 122-1 to create a respective signed block 124-1. In system 100, a homomorphism is shown when a result obtained by adding two vectors in a vector space and hashing to an elliptic curve is the same as the sum of the respective hashes of the two vectors on that elliptic curve. An exemplary such scheme to sign the block segments is described below in the section titled "Exemplary Homomorphic Signature Scheme." Server 102 communicates the signed blocks 124-1 is a linear combination of packets (or vectors) across network 104 to one or more client devices 106. Exemplary network coding operations to generate such a linear combination of packets are described in greater detail below in the section titled "Network Coding Model."

Responsive to receiving the random linear combinations of packets comprising the signed blocks 124-1, a client device 106 verifies the signature of the server 102 for each signed block 118. An exemplary such verification process based on bilinearity of the Weil-pairing is described below in the section titled "Exemplary Homomorphic Signature Scheme." These verification operations allow the client device 106 to identify a dishonest server 102 within content distribution system 100. Responsive to verifying and authenticating each signed block 124-1, if the client device 106 is not the final destination for the received random linear combination of packets, the client device 106 implements the operations described above (and below) with respect to server 102 to digitally re-sign the data into points on an elliptic curve using a homomorphic hash function, and redistribute the signed data to the destination device using network coding operations.

That is, if client device 106 is not designated by the linear combination of packets as being the final recipient for the received content, and if the received content has been successfully verified and authenticated, coding module 116-2, which knows the digital signatures of some of the received content: (a) re-signs the received content; and (b) redistributes the newly re-signed content as a new linear combination of packets (a respective portion of "other data" 116-2) to a different client device 106. This process is iterative until a respective client device 106 is a final destination for content in a linear combination of packets received from either a server 102 and/or a client device 106. These latter operations allow a data receiving client device 106 to sign packets combined at various nodes in the network 104 without contacting the source (e.g., server 102 and/or another client device 106 ) to sign the packets in the new linear combination of packets.

Elliptic Curve Background

This section presents aspects of elliptic curves over finite fields. An elliptic curve E over a finite field $F_q$ (this is sometimes abbreviated as $E/F_q$). Referring to the finite field, q>3 is a power of a prime, and a projective curve in $p^2(F_q)$ is given by an equation of the form $$Y^2Z = X^3 + AXZ^2 + BZ^3,$$

with $A, B \in F_q$ and $4A^3 + 27B^2 \neq 0$. The curve has two affine pieces: the piece with $Z \neq 0$ has the affine form $y^2 = x^3 + Ax + B$ (obtained by setting x=x/z and y=y/z); and the piece with Z=0 which has only one (projective) point namely (0:1:0) which we denote O. Let K be a field (not necessarily finite) that contains $F_q$, the set $$E(K) = \{(x,y) \in K \times K : y^2 = x^3 + Ax + B\} \cup \{O\}$$

can be given the structure of an abelian group with O as the identity of the group. Moreover, the group operations can be efficiently computed in particular, if P,Q are points on E with coordinates in $F_q$, then P+Q and −P can be computed in $O(\log^{1+\epsilon} q)$ bit operations for any $\epsilon > 0$. Hasse's theorem gives a tight estimate for the size of the group $E(F_q)$:

$$q + 1 - 2\sqrt{q} \leq \text{é}E(F_q) \leq q + 1 + 2\sqrt{q}.$$

The Schoof-Elkies-Atkin algorithm is a deterministic polynomial time algorithm that computes $\text{é}E(F_q)$.

The Weil Pairing

Let $E/F_q$ be an elliptic curve and let $\overline{F}_q$ be an algebraic closure of $F_q$. If m is an integer such relatively prime to the characteristic of the field $F_q$, then the group of m-torsion points, $E[m] = \{P \in E(\overline{F}_q) : mP = O\}$, have the following structure:

$$E[m] \cong Z/mZ \times Z/mZ.$$

There is a map $e_m : E[m] \times E[m] \rightarrow \overline{F}^*_q$ with the following properties:

The map $e_m$ is bilinear:

$$e_m(S_1+S_2,T)=e(S_1,T)e(S_2,T)$$

$$e_m(S,T_1+T_2)=e(S,T_1)e(S,T_2).$$

Alternating: $e_m(T,T)=1$ and so $e_m(T,S)=e_m(S,T)^{-1}$.

Non-degenerate: If $e_m(S,T)=1$ for all $S\in E[m]$ then $T=O$.

Let $E/F_q$ be an elliptic curve and let $S,T$ be two m-torsion points on E with coordinates in $F_q$. Then there is a deterministic algorithm that can evaluate $e_m(S,T)$ in $O(\log m \log^{1+\epsilon} q)$ bit operations. When clear from the context, the subscript m is dropped when writing $e_m$.

A Network Coding Model

A standard network coding framework for content distribution follows. Let $G=(V,E)$ be a directed graph. A source $s\in V$ (e.g., a server 102 and/or a client 106) wishes to transmit some data (content for distribution) to a set $T\subseteq V$ of the vertices. One chooses a vector space $W/F$ (say of dimension d ) and views the data to be transmitted (e.g., segmented content) as a bunch of vectors $w_1,L,w_k\in W$. The source then creates the augmented vectors $v_1,L,v_k$ by setting $$v_i = (\underbrace{0, L, 0,}_{i-1\ zeros} \underset{1}{1}, L, 0, \underset{2}{w_{i1}}, L, \underset{3}{w_{id}})$$

where $W_{ij}$ is the j-th coordinate of the vector $w_i$. One can assume without loss of generality that the vectors $v_i$ are linearly independent. We denote the subspace (of $F_p^{k+d}$) spanned by these vectors by V. Each edge $e\in E$ computes a linear combination, $y(e)$, of the vectors entering the vertex $v=in(e)$, that is to say $$y(e) = \sum_{f:out(f)=v} m_e(f)y(f)$$

where $m_e \in F_p$. We consider the source as having k input edges carrying the k vectors $w_i$. By induction one has that the vector $y(e)$ on any edge is a linear combination $y(e)=\Sigma_{1\leq i\leq k}g_i(e)v_i$ and is a vector in V. The k-dimensional vector $g(e)=<g_1(e), L,g_k(e)>$ is simply the first k-coordinates of the vector $y(e)$. We call the matrix whose rows are the vectors $g(e_1),L,g(e_k)$, where $e_i$ are the incoming edges for a $t\in T$, as the global encoding matrix for t and denote it $G_t$. In practice the encoding vectors are chosen at random so the matrix $G_t$ is invertible with high probability. Thus any receiver, on receiving $y_1,L,y_k$ can find $w_1,L,w_k$ by solving $$\begin{bmatrix} y_1 \\ y_2 \\ M \\ y_{k'} \end{bmatrix} = G_t \begin{bmatrix} w_1 \\ w_2 \\ M \\ w_{k'} \end{bmatrix},$$

where the $y_i$ are the vectors formed by removing the first k coordinates of the vector $y_i$.

An Exemplary Homomorphic Signature Scheme

Network coding module 116 implements the following exemplary homomorphic signature scheme. Let p be a prime number (shown as respective portions of "other program data" 120) and q a power of a different prime with p<<q. Let $V/F_p$ be a vector space of dimension d+k and let $E/F_q$ be an elliptic curve such that $R_1,L,R_k,P_1,L,P_d$ are all (distinct) points of p-torsion on $E(F_q)$. We can define a function $h_{R_1,L,R_k,P_1,L,P_d}:V\to E(F_q)$ as follows: for $$v = \langle u_1, L, u_k, v_1, L, v_d \rangle \in V$$

$$h_{R_1,L,R_k,P_1,L,P_d}(v) = \sum_j u_j R_j + \sum_i v_i P_i.$$

The function $h_{R_1,L,R_k,P_1,L,P_d}$ is a homomorphism (of additive abelian groups) from the vector space V to the group E[p] of p-torsion points (a respective portion of "other program data" 120) on the curve.

Suppose the server 102 (or the client 106 ) wishes to distribute $v_1,L,v_k\in V$ to a client device 106, the server chooses $s_1,L,s_k$ and $r_1,L,r_d$ which are secret in $F_p$. Such secrets are shown as respective portions of "other program data" 120. Server 102 then signs the packet $v_i$ (i.e., signed blocks 124) by computing $$h_i = h_{s_1 R_1, L, s_k R_k, r_1 P_1, L, r_d P_d}(v_i).$$

The server publishes $R_1,L,R_k,P_1,L,P_d,Q,s_jQ$ for $1\leq j\leq k$ and $r_iQ$ for $1\leq i\leq d$ (i.e., server published data portion of "other program data" 120). Here Q is another point of p-torsion on the elliptic curve distinct from the others such that $e_p(R_j,Q)\neq 1$ and $e_p(P_i,Q)\neq 1$ for $1\leq j\leq k$ and $1\leq i\leq d$.

This signature $h_j$ (i.e., a homomorphic digital signature 122) is also appended to the data $v_j$ and transmitted according to the distribution scheme. Now, at any edge e that computes $$y(e) = \sum_{f:out(f)=in(e)} m_e(f)y(f)$$

coding module 116 also computes $$h(e) = \sum_{f:out(f)=in(e)} m_e(f)h(f)$$

and transmits $h(e)$ together with the data $y(e)$ as a linear combination of packets. Since the computation of the signature $h(e)$ is a homomorphism, we have that if $$y(e) = \sum_i \alpha_i v_i$$

then $$h(e) = \sum_i \alpha_i h_i.$$

Exemplary Verification Process

Next we describe the verification process implemented by a respective client device 106. Suppose $y(e)=<u_1,L,u_k,v_1,L,v_d>$, digital signatures for network coding module 116-2 determines whether $$\prod_{1 \le j \le k} e(u_j R_j, s_j Q) \prod_{1 \le i \le d} e(v_i P_i, r_i Q) = e(h(e), Q).$$

This works because if h(e) is the legitimate signature of y(e) then by definition $$h(e) = \sum_{1 \le j \le k} u_j s_j R_j + \sum_{1 \le i \le d} v_i r_i P_i,$$

thus $$e(h(e), Q) = e\left(\sum_{1 \le j \le k} u_j s_j R_j + \sum_{1 \le i \le d} v_i r_i P_i, Q\right)$$

$$= \prod_{1 \le j \le k} e(u_j s_j R_j, Q) \prod_{1 \le i \le d} e(v_i r_i P_i, Q) \text{(by bilinearity)}$$

$$= \prod_{1 \le j \le k} e(u_j R_j, s_j Q) \prod_{1 \le i \le d} e(v_i P_i, r_i Q) \text{(again by bilinearity)}.$$

The verification uses the bilinearity of the Weil-pairing. Note that all the terms in the above verification can either be computed from the vector y(e) or from the public information.

The signature 122 is a point on the elliptic curve with coordinates in $F_q$, thus the size of the signature is O(log q) bits and this is the transmission overhead. The computation of the signature h(e) requires $O(d_{in} \log p \log^{1+\epsilon} q)$ bit operations where $d_{in}$ is the in-degree of in(e). The verification of a signature requires $O((d+k)\log p \log^{1+\epsilon} q)$ bit operations.

Proof of Security

Notation of the previous section is also used in this section. To thwart the described signature scheme, an adversary can either produce a hash collision for the function $h_{s_1 R_1, L, s_k R_k, r_1 P_1, L, r_d P_d}$ or he can forge the signature such that the verification goes through. Note that in this situation the adversary has no knowledge of the points $s_1 R_1, L, s_k R_k$ and $r_1 P L$, $r_d P_d$. We first show that even if the adversary knew the points, producing a collision is still as hard as computing discrete logs. We make the claim precise next:

Problem: Hash-Collision. Fix an integer r>1. Input: Given $P_1, L, P_r$, points in a cyclic subgroup of order p (a prime) on an elliptic curve $E/F_q$. Output: Tuples $a=(a_1, L, a_r)$, $b=(b_1, L, b_r)$ $\in F_p^r$ such that a≠b and $$\sum_{1 \le i \le r} a_i P_i = \sum_{1 \le j \le r} b_j P_j.$$

Proposition 1. There is a polynomial time reduction from Discrete Log on the cyclic group of order p on elliptic curves to HASH-COLLISION.

Proof: First we treat the case when r=2. Let P and Q be points of order p on $E(F_q)$ that are not the identity. Assume that Q lies in the subgroup generated by P. Our aim is to find a such that Q=aP, to this end we apply the alleged algorithm that solves HASH-COLLISION to the points P and Q. The algorithm produces two distinct pairs $(x,y),(u,v) \in F_p^2$ such that xP+yQ=uP+vQ.

This gives us a relation (x−u)P+(y−v)Q=O. We claim that x≠u and y≠v. Suppose that x=u, then we would have (y−v)Q=O, but Q is a point of order p (a prime) thus y−u≡0 mod p in other words y=v in $F_p$. This contradicts the assumption that (x,y) and (u,v) are distinct pairs in $F_p^2$. Thus we have that Q=−(x−u)(y−v)$^{-1}$P, where the inverse is taken modulo p.

If we have r>2 then we can do one of two things. Either we can take $P_1=P$ and $P_2=Q$ as before and set $P_i=O$ for i>2 (in this case the proof reduces to the case when r=2), or we can take $P_1=r_1 P$ and $P_i=r_i Q$ where $r_i$ are chosen at random from $F_p$. We get one equation in one unknown (the discrete log of Q). It is quite possible that the equation we get does not involve the unknown. However, this happens with very small probability as we argue next. Suppose the algorithm for HASH-COLLISION gave us that $$a r_1 P + \sum_{2 \le i \le r} b_i r_i Q = O$$

then as long as $\Sigma_{2 \le i \le r} b_i r_i \not\equiv 0$ mod p, we can solve for the discrete log of Q. But the $r_i$'s are unknown to the oracle for HASH-COLLISION and so we can interchange the order in which this process occurs. In other words, given $b_i$, for $2 \le i \le r$, what is the probability that the $r_i$'s we chose satisfy $\Sigma_{2 \le i \le r} b_i r_i = 0$? It is clear that the latter probability is 1/p. Thus with high probability we can solve for the discrete log of Q.

One can also conclude the above proposition from the proof presented in Bellare, M.; Goldreich, O.; Goldwasser, S.; Incremental cryptography: The case of hashing and signing, in Advances in Cryptology CRYPTO'94, Santa Barbara, Calif., 1994. This proof deals with finite fields but the argument applies equally well to the case of elliptic curves.

We have shown that producing hash collisions in the scheme implemented by digital signature for network coding module 116 is difficult. The other method by which an adversary can foil the scheme is by forging a signature. However, forging a signature is at least as hard as solving the so-called computational co-Diffie-Hellman problem on the elliptic curve. The only known way to solve this problem on elliptic curves is via computing discrete-logs. Thus forging a signature is at least as hard as solving the computational co-Diffie-Hellman on elliptic curves and probably as hard as computing discrete-logs.

Exemplary Setup

The notation presented above when describing the network coding model and exemplary homomorphic signature scheme is also utilized in this section. To initialize the signature scheme module 116 of FIG. 1 selects a prime p along with an as described below over a suitable field that has the whole p-torsion defined over that field. Exemplary techniques to select an elliptic curve are described below in the section titled "Finding a Suitable Elliptic Curve". Module 116 also identifies a set of p-torsion points which are needed to define the homomorphic signature 122. In this section we discuss all these matters and we also provide an example.

In Summary:

Pick a large prime p.

Pick a suitable prime (as described below in the section titled "Finding a Suitable Elliptic Curve") 1 and an elliptic curve E over $F_1$ that has a multiple of p many points.

Find an extension $F_q$ of the field $F_1$ such that $E[p] \subseteq E(F_q)$ (here E[p] refers to the set of all p-torsion points).

Since $\acute{e}E(F_1) \equiv 0$ mod p it has p-torsion points. Let $O \neq P \in E(F_1)$ be a p-torsion point on the curve. Take $R_i = a_i P$ for $1 \leq i \leq k$ and $P_j = b_j P$ for $1 \leq j \leq d$ where $a_i$ and $b_i$ are picked at random from the set $1, L, p-1$.

Q is a point such that $e(R_i, Q) \neq 1$ and $e(P_j, Q) \neq 1$. To ensure this, it suffices to pick a point of p-torsion that is defined over $F_q$ but not over the smaller field $F_1$. Indeed, let Q be such a point, then if $e(R_i, Q) = 1$ this would imply that $e(A,B) = 1$ for any $A, B \in E[p]$ (since $R_i$ and Q generate $E[p]$) which contradicts the non-degeneracy of the Weil-pairing.

Lastly, module 116 selects the secret keys $s_1, L, s_k$ and $r_1, L, r_d$ at random from $F^*_p$.

Finding a Suitable Elliptic Curve

In general, if we have an elliptic curve E over a finite field K then the p-torsion points could be defined over an extension of degree $\Theta(p^2)$ over the field K. The p-torsion points are defined over a small field so that the operations of module 116 can be carried out in polynomial time. In this section we discuss how one can pick a suitable field $F_1$ and an elliptic curve over this field that has all its p-torsion defined over a small relative extension of the base field.

The known theory of complex multiplication of elliptic curves can be used to generate elliptic curves over a finite field with a certain number of points on them. The details of this algorithm are not necessary for our usage but, its running time is utilized, so we describe it next. Suppose we wish to produce an elliptic curve $E/F_1$ (where 1 is a prime) that has exactly N points, where N lies in the interval $1+1-2\sqrt{1} \leq N \leq 1+1+2\sqrt{1}$. Write N as $1+1-t$ and set $Dy^2 = t^2 - 41$, where D or D/4 is squarefree (note that D is negative because of the Hasse bound). Then the algorithm to produce such a curve runs in time $|D|^{O(1)}$.

In system 100, an elliptic curve is sought with a small multiple of p points, this tells us that the field $F_1$ over which we should look for such a curve must have $1+1-2\sqrt{1} \leq mp \leq 1+1+2\sqrt{1}$. Additionally, $t^2 - 41$ should have a small squarefree part, since this determines the running time of the method to generate such a curve. A prime 1 is selected such that $41 = 4p^2 - Dy^2$ for a small (negative) D and also $1 \equiv -1$ mod p; and we set $t = 2p$. Thus $1+1-t = 1+1-2p \equiv 0$ mod p and so the number of points on the elliptic curve will be a multiple of p and the time to produce such a curve will also be reasonable since $|D|$ is small.

To produce such a prime 1, a (negative) D (with $|D|$ small) is selected. It is determined whether $\frac{1}{4}(p^2 - Dy^2)$ is prime for $y = 0, 1, L$. Since we are only interested in primes that are $\equiv -1$ mod p, the above check is performed only for those values of y such that $-Dy^2 \equiv -4$ mod p. A conjecture of Lang-Trotter tells us that there will be many values of y that yield a prime. This is also related to a conjecture of Hardy-Littlewood on the prime values of quadratic polynomials. Now the complex multiplication method produces for us an elliptic curve E over $F_1$ that has some p-torsion points. However, we need an elliptic curve such that $E[p]$ is defined over a small degree extension of $F_1$. This is where the additional constraint that $1 \equiv -1$ mod p is used. Since $1 \equiv -1$ mod p the order of 1 in $F^*_p$ is 2. Now a theorem of Koblitz-Balasubramanian shows that in this case the entire p-torsion is defined over a degree 2 extension over the base field, in other words $E[p] \subseteq F_{1^2}$. Now we have an elliptic curve $E/F_1$ (a respective portion of "other program date" 120) and we know that it has all its p-torsion defined over E[1], but how do we find these points? This is the subject of the next paragraph.

Remark 1. The theory of complex multiplication tells us that the curve E depends only on the quantity D. More precisely, for each D there is a finite list of elliptic curves $E_1, L, E_m$ over a number field K such that E mod 1 satisfies our requirements. This is illustrated below in the section titled "Example".

Finding p-Torsion Points

Let $E/F_1$ be the elliptic curve identified using the method given above. Then $\acute{e}E(F_1) = 1 + 1 - 2p$, and let m be the largest divisor of $\acute{e}E(F_1)$ that is relatively prime to p. Let P be a random point on the curve $E(F_1)$. Suppose $mP \neq O$, then mP is a point of p-power torsion (by Lagrange's theorem). Let $i \geq 1$ be the smallest integer such that $mp^i P = O$ but $mp^{i-1} P \neq O$. Then $mp^{i-1} P$ is a point of p-torsion. Of course, if we found that $mP = O$ we repeat by finding another random point P. The probability that for a random point P, $mP = O$ is at most $1/p$ and so we will find a non-trivial point of p-torsion with very high probability.

This gives us the piece of the p-torsion defined over $F_1$. To find the piece of the p-torsion defined over $F_{1^2}$ we repeat the above process over $F_{1^2}$. To carry this process out we need to know the number of points on $E(F_{1^2})$. It turns out that if E is defined over a finite field K, then the number of points on E over any extension of K is determined by $\acute{e}E(K)$. The theory predicts that for our curve E, $\acute{e}E(F_{1^2}) = 1^2 + 1 - \alpha^2 - \overline{\alpha}^2$, where $\alpha, \overline{\alpha}$ are the two roots (in C) of the equation $$\phi^2 - 2p\phi + 1 = 0.$$

An Example

This example was produced using the computer algebra package MAGMA. For this example we take $D = -4$. For any prime p, a suitable prime 1 is one that satisfies $41 = 4p^2 + 4y^2$ such that $1 \equiv -1$ mod p. The congruence implies that $y^2 \equiv -1$ mod p, in other words $-1$ should be a quadratic residue mod p. This in turn implies that $p \equiv 1$ mod 4, and that values of y that we need to search should be congruent to one of the square roots of $-1$ mod p.

Let p be a prime as follows:

2633001836857174220657463256606550840223150899915 3.

We search for prime values of $p^2 + y^2$ with special properties. The complex multiplication method tells us that the elliptic curve $$E: y^2 32 x^3 + x \text{(in affine form)}$$

is a suitable elliptic curve. MAGMA tells us that $\acute{e}E(F_1)$ is:

351688192729081689963486221568344816704455675519 6219863
06651119145697661326414 2
847616337439963943072004, which is indeed $\equiv 0$ mod p. The number of points on $E(F_{1^2})$ according to MAGMA is 123684584905047707258686141200578231465582664681 87459361
2259486008465018014484 6
014265383739300784290963417699135578021643493118 755
085472626923470388577638414 2
268869493894468081319453336772812036965744626464, and this is $\equiv 0$ mod $p^2$, which is a necessary condition for $E[p]$ being a subgroup of $E(F_{1^2})$. We show that $E[p]$ is indeed contained in $E(F_{1^2})$ by finding two points that generate the p-torsion subgroup. Following the method outlined in §5.2 we find two points of p-torsion P and Q that generate the whole p-torsion of $E(F_{1^2})$ $$P = \begin{pmatrix} 276701049983509532223410633845208244402927 \\ 762773463732533683876759414814860258330 \\ 843763239769722154862, 73689561907486287044 \\ 1993260428363309212341952700619990022013 \\ 7331297834986221601940750818713297548511336 \end{pmatrix}$$

$$Q = \begin{pmatrix} 170343693342782875614389009934880452750 \\ 690840443235518664737403675324957564030 \\ 783969925246047852550333 \ u + \\ 1517288746986618549950168117167220951525 \\ 0776009775673129863778174369969862913861 \\ 485893531567999093434396 \ , \\ 2932629794146247765964324029396184318939 \\ 0751742809582976552055332632102947256524 \\ 0814005665686795414190 \ u + \\ 2827229136528454163001184937157406163795 \\ 2191623737718932812446648142173366870541 \\ 6653836715431228856385081 \end{pmatrix}$$

Here u is a variable that gives the isomorphism $F_{1^2} \cong F_1[u]/(f(u))$ for a quadratic irreducible $f \in F_1[u]$. The Weil pairing of P and Q is $$e_p(P, Q) = \begin{pmatrix} 1180361802998353725465339038203546299320540 \\ 9477769908010460376604157793595815931726560 \\ 75406185808275672 \ u + \\ 3128465568396111702537893826504889755054071 \\ 4789120952758071081994025493561718896167258 \\ 60797979581965315. \end{pmatrix}$$

An Exemplary Procedure

Figure 2:
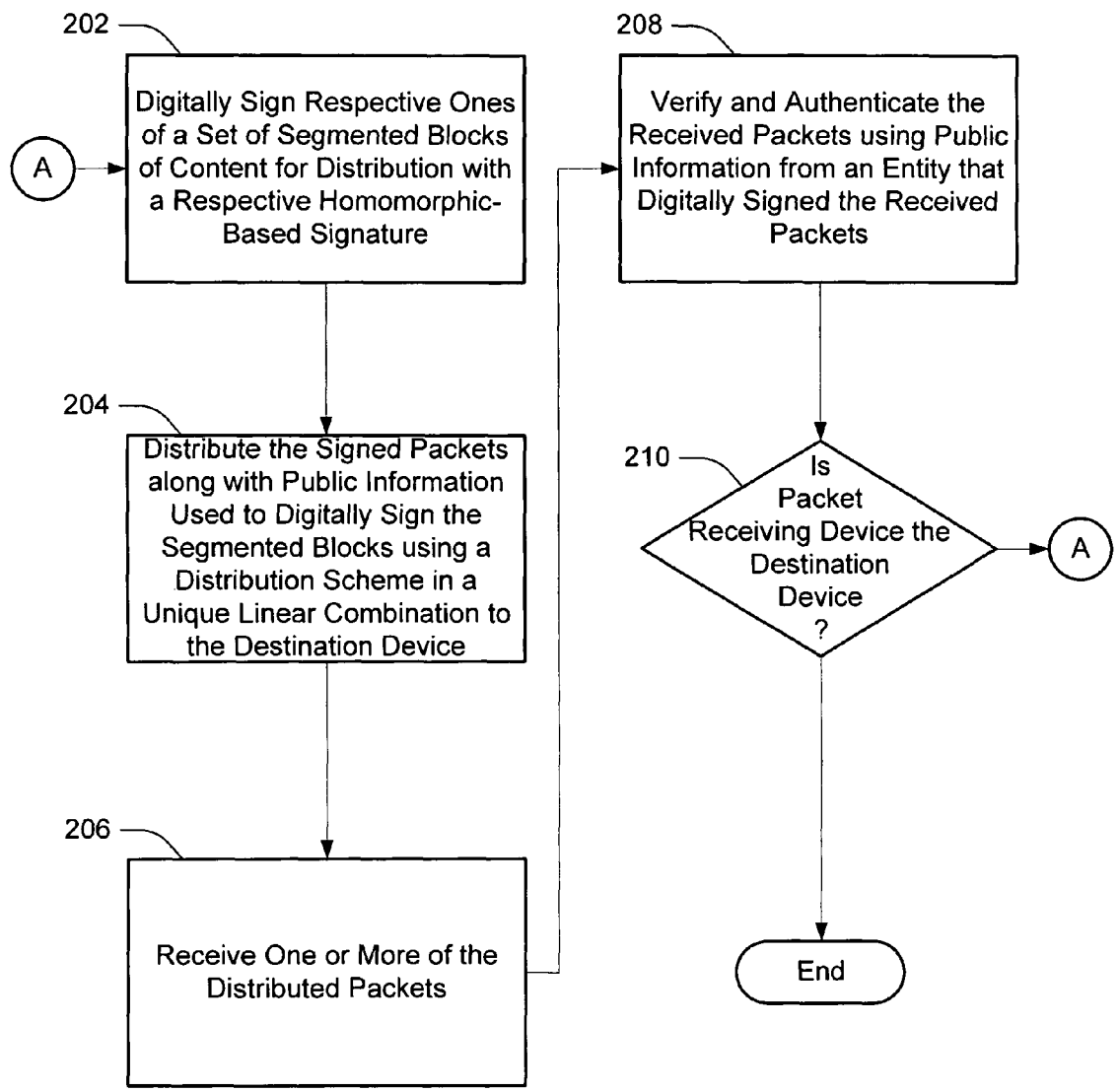
FIG. 2 shows an exemplary procedure to use digital signatures in network coding distribution schemes, according to one embodiment.

FIG. 2 shows an exemplary procedure 200 for digital signatures for network coding, according to one embodiment. For purposes of exemplary description, the operations of procedure 200 are described with respect to components of system 100 of FIG. 1. The leftmost numeral of a component reference number indicates the particular figure where the component is first described.

The block 202, a server 102 digitally signs respective ones of a set of segmented blocks of content for distribution with respective homomorphic digital signatures 122 (FIG. 1). This is accomplished by transforming vectors (e.g., respective ones of the segmented blocks) into a set of points on an elliptic curve. These transformations are performed using a collision resistant hash function that is a homomorphism (of additive abelian groups) from a vector space to a group of a prime number of torsion points on an elliptic curve.

At block 204, server 102 distributes the packets along with public information (e.g., certain distinct prime number (p) torsion points on the elliptic curve) used to sign the segmented content encapsulated in the packets, across network 104 to a destination device (e.g., a respective client device 106). The packets and information are distributed using a distribution scheme. In one implementation, the distribution scheme is a network coding distribution scheme. Secret information such as secret keys and hash digests, which were used in the operations of block 202 to digitally sign the segmented content (i.e. vectors), are not distributed by server 102 with the linear combination of packets and the public information.

At block 206, a client device 106 receives one or more of the distributed linear combination of packets. At block 208, the client device 106 verifies and authenticates content encapsulated in the received packets using the public information distributed by the server along with the received packets. At block 210, the client device 106 determines whether it is the final destination device for receipt of the received packets. If not, operations continue at block 202 as described above, wherein the client device 106, in effect, becomes the server 102. More particularly, in this scenario, the client device 106, knowing the digital signatures of some of the linear combination of packets, the client device 106 can produce a signature of any linear combination of the packets (i.e., the received packets). This allows the client device 106 to digitally re-sign the packets without contacting the source (i.e. in this iteration, server 102). Additionally, this allows the client device to detect any node (e.g., a server 102 and/or a client 106) that maliciously claimed that linear combination of inputs was sent, when in fact the node injected some other data or garbage. With this in mind, the client device distributes the re-signed packets in a new linear combination, along with associated public information used to digitally sign the segmented blocks, to the destination device. The operations of blocks 202 through 210 are interatively repeated by any number of servers 102 and client devices 106 until the distributed content has reached the destination device.

An Exemplary Operating Environment

Figure 3:
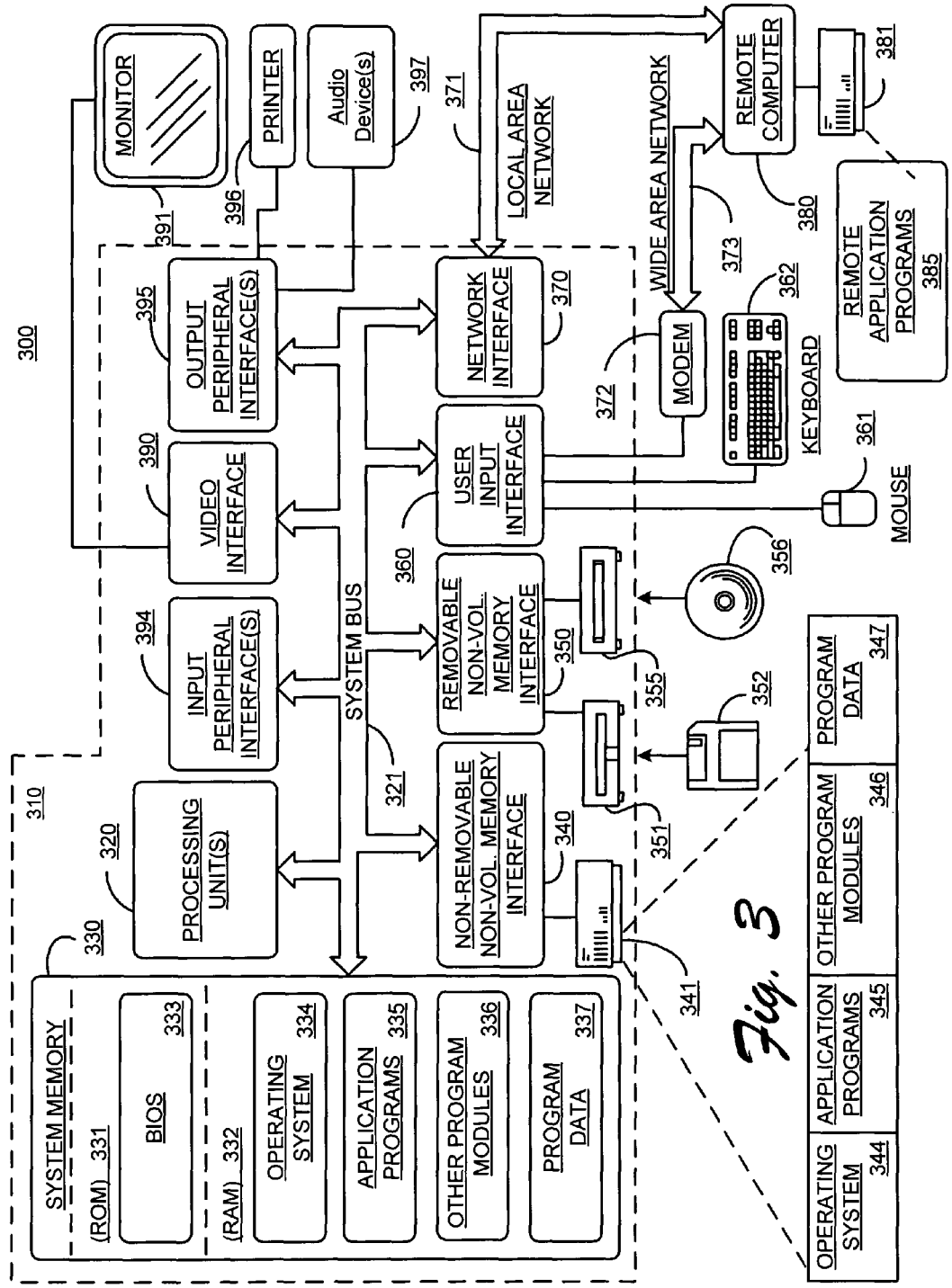
FIG. 3 illustrates an example of a suitable computing environment in which digital signatures for network coding may be fully or partially implemented.

FIG. 3 illustrates an example of a suitable computing environment in which digital signatures for network coding may be fully or partially implemented. Exemplary computing environment 300 is only one example of a suitable computing environment for the exemplary system of FIG. 1 and exemplary operations of FIG. 2, and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 3, an exemplary system for digital signatures for network coding includes a general purpose computing device in the form of a computer 310 implementing, for example, system 100 of FIG. 1. The following described aspects of computer 310 are exemplary implementations of computing devices 102 and 104 of FIG. 1. Components of computer 310 may include, but are not limited to, processing unit(s) 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 310 typically includes a variety of computer-readable media. Computer-readable media can be any available media that can be accessed by computer 310 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example and not limitation, FIG. 3 illustrates operating system 334, application programs 333, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 331 that reads from or writes to a removable, nonvolatile magnetic disk 332, and an optical disk drive 333 that reads from or writes to a removable, nonvolatile optical disk 336 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 331 and optical disk drive 333 are typically connected to the system bus 321 by a removable memory interface, such as interface 330.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 343, other program modules 346, and program data 347. Note that these components can either be the same as or different from operating system 334, application programs 333, other program modules 336, and program data 337. Application programs 333 includes, for example program modules 122 of FIG. 1. Program data 337 includes, for example, program data 114 of FIG. 1. Operating system 344, application programs 343, other program modules 346, and program data 347 are given different numbers here to illustrate that they are at least different copies.

A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB).

A monitor 391 or other type of display device is also connected to the system bus 321 via an interface, such as a video interface 390. In addition to the monitor, computers may also include other peripheral output devices such as printer 396 and audio device(s) 397, which may be connected through an output peripheral interface 393.

The computer 310 may operate in a networked environment using logical connections to one or more remote computers, such as a remote computer 380. In one implementation, remote computer 380 represents computing device 102 or networked computer 104 of FIG. 1. The remote computer 380 may be a personal computer, a server, a router, a network PC, a peer device or other common network node, and as a function of its particular implementation, may include many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 383 as residing on memory device 381. The network connections shown are exemplary and other means of establishing a communications link between the computers may be used.

CONCLUSION

Although the systems and methods for digital signatures in network coding have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A computer-implemented method comprising:
   selecting an elliptic curve defined over a finite field, the elliptic curve having a plurality of points;
   segmenting content into a plurality of blocks of content for distributing the content over a network to a plurality of computing devices;
   digitally signing, using respective homomorphic digital signatures, respective blocks of content to create a plurality of digitally signed blocks of content, the digitally signing comprising computing a respective homomorphic signature for each respective block of content, the homomorphic signatures being computed based on one or more of the plurality of points on the defined elliptic curve;
   distributing, using a distribution scheme, a random linear combination of packets to a destination device, the random linear combination of packets comprising the digitally signed blocks of content and public information used to digitally sign the respective blocks of content, the public information comprising certain distinct prime numbers and at least one point on the defined elliptic curve; and
   wherein a device receiving one or more packets of the random linear combination of packets uses the homomorphic digital signatures and the public information to verify and authenticate content associated with the one or more packets without requiring secure transmission of secret keys and hash digests used to digitally sign the one or more packets.

2. The method of claim 1, wherein the distribution scheme is a network coding content distribution scheme.

3. The method of claim 1, wherein a server computing device that is a source of the content carries out computations for selecting the elliptic curve defined over the finite field for use in computing the homomorphic signatures.

4. The method of claim 1, wherein the homomorphic digital signatures and the public information allow a device receiving one or more packets of the random linear combination of packets to re-sign content associated with any subset of the random linear combination of packets independent of contacting a source of the one or more packets, the re-signed content for subsequent distribution in a new random linear combination to the destination device, and for subsequent verification and authentication and distribution by any intermediate client device that is not the destination device.

5. The method of claim 1, wherein the digitally signing further comprises transforming vectors of the respective blocks of content into a set of points on the elliptic curve using a collision resistant hash function that is a homomorphism from a vector space to a group of a prime number of torsion points on the elliptic curve.

6. The method of claim 1, wherein the digitally signing further comprises:
   picking a large prime;
   selecting a suitable prime l and the elliptic curve E over $F_l$ that has a multiple of p many points;
   locating an extension $F_q$ of the field $F_l$ such that $E[p] \subseteq E(F_q)$, $E[p]$ being associated with a set of all p-torsion points on the elliptic curve;
   determining an $R_i = a_i P$ for $1 \leq i \leq k$ and $P_j = b_j P$ for $1 \leq j \leq d$ where $a_i$ and $b_i$ are picked at random from a set $1, \ldots, p-1$, $\acute{e}E(F_l) \equiv 0 \bmod p$ such that it has p-torsion points, $O \neq P \in E(F_l)$ is a p-torsion point on the elliptic curve;
   selecting secret keys $s_1, \ldots, s_k$ and $r_1, \ldots, r_d$ at random from $F^*_p$; and
   hashing vectors of the respective blocks of content into a set of points on the elliptic curve.

7. A computer-readable medium comprising computer-program instructions executable by a processor for performing actions comprising:
   digitally signing, using respective homomorphic digital signatures, respective blocks of content to create digitally signed blocks of content, the digitally signing comprising computing a respective homomorphic signature for each respective block of content, the homomorphic signatures being computed using a selected elliptic curve defined over a finite field;
   distributing, using a distribution scheme, a linear combination of packets to a destination device, the linear combination of packets comprising the digitally signed blocks of content and public information used to digitally sign the respective blocks of content; and
   the homomorphic digital signatures and the public information allowing a device receiving one or more packets of the linear combination of packets to verify and authenticate content associated with the one or more packets.

8. The computer-readable medium of claim 7, wherein the distribution scheme is a network coding content distribution scheme.

9. The computer-readable medium of claim 7, wherein the public information comprises certain distinct prime numbers and points on the selected elliptic curve used to sign the respective blocks of content.

10. The computer-readable medium of claim 7, wherein the homomorphic digital signatures and the public information allow a device receiving one or more packets of the linear combination of packets to re-sign content associated with any subset of the linear combination of packets independent of contacting a source of the one or more packets, the re-signed content for subsequent distribution in a new linear combination to the destination device, and for subsequent verification and authentication and distribution by any intermediate client device that is not the destination device.

11. The computer-readable medium of claim 7, wherein the computer-program instructions for the digitally signing further comprises instructions for transforming vectors of the respective blocks of content into a set of points on the selected elliptic curve using a collision resistant hash function that is a homomorphism from a vector space to a group of a prime number of torsion points on the selected elliptic curve.

12. The computer-readable medium of claim 7, wherein the computer-program instructions for the digitally signing further comprises instructions for:
   picking a large prime;
   selecting a suitable prime l and the selected elliptic curve E over $F_l$ that has a multiple of p many points;
   locating an extension $F_q$ of the field $F_l$ such that $E[p] \subseteq E(F_q)$, $E[p]$ being associated with a set of all p-torsion points on the selected elliptic curve;
   determining an $R_i = a_i P$ for $1 \leq i \leq k$ and $P_j = b_j P$ for $1 \leq j \leq d$ where $a_i$ and $b_i$ are picked at random from a set $1, \ldots, p$ $-1$, $\acute{E}(F_l) \equiv O \bmod p$ such that it has p-torsion points, $O \neq P \in E(F_l)$ is a p-torsion point on the selected elliptic curve;

selecting secret keys $s_1, \ldots, s_k$ and $r_1, \ldots, r_d$ at random from $F^*_p$; and hashing vectors of the respective blocks of content into a set of points on the selected elliptic curve.

13. A computing device comprising:

a processor; and a memory coupled to the processor, the memory comprising computer-program instructions executable by the processor for:

digitally signing, using respective homomorphic digital signatures, respective blocks of content to create digitally signed blocks of content, the homomorphic signatures being computed based on a selected elliptic curve;

distributing, using a distribution scheme, a linear combination of packets to a destination device, the linear combination of packets comprising the digitally signed blocks of content and public information used to digitally sign the respective blocks of content; and the homomorphic digital signatures and the public information allowing a device receiving one or more packets of the linear combination of packets to verify and authenticate content associated with the one or more packets.

14. The computing device of claim 13, wherein the distribution scheme is a network coding content distribution scheme.

15. The computing device of claim 13, wherein the public information comprises certain distinct prime numbers and points on the selected elliptic curve used to sign the respective blocks of content.

16. The computing device of claim 13, wherein the homomorphic digital signatures and the public information allow a device receiving one or more packets of the linear combination of packets to re-sign content associated with any subset of the linear combination of packets independent of contacting a source of the one or more packets, the re-signed content for subsequent distribution in a new linear combination to the destination device, and for subsequent verification and authentication and distribution by any intermediate client device that is not the destination device.

17. The computing device of claim 13, wherein the computer-program instructions for the digitally signing further comprises instructions for transforming vectors of the respective blocks of content into a set of points on the selected elliptic curve using a collision resistant hash function that is a homomorphism from a vector space to a group of a prime number of torsion points on the selected elliptic curve.

18. The computing device of claim 13, wherein the computer-program instructions for the digitally signing further comprises instructions for:

picking a large prime;

selecting a suitable prime l and the selected elliptic curve E over $F_l$ that has a multiple of p many points;

locating an extension $F_q$ of the field $F_l$ such that $E[p] \subseteq E(F_q)$, $E[p]$ being associated with a set of all p-torsion points;

determining an $R_i = a_i P$ for $1 = i = k$ and $P_j = b_j P$ for $1 \leq j \leq d$ where $a_i$ and $b_i$ are picked at random from a set $1, \ldots, p-1$, $\acute{e}E(F_l) \equiv 0 \bmod p$ such that it has p-torsion points, $O \neq P \in E(F_l)$ is a p-torsion point on the selected elliptic curve;

selecting secret keys $s_1, \ldots, s_k$ and $r_1, \ldots, r_d$ at random from $F^*_p$; and hashing vectors of the respective blocks of content into a set of points on the selected elliptic curve.

* * * * *

UNITED STATES PATENT AND TRADEMARK OFFICE
CERTIFICATE OF CORRECTION

PATENT NO.        : 7,743,253 B2
APPLICATION NO.   : 11/267096
DATED             : June 22, 2010
INVENTOR(S)       : Kristin E. Lauter et al.

It is certified that error appears in the above-identified patent and that said Letters Patent is hereby corrected as shown below:

In column 16, line 66, in Claim 12, delete "$1=i\leqq k$" and insert -- $1\leq i \leq k$ --, therefor.

In column 17, line 1, in Claim 12, delete "$\acute{E}(F_l)$" and insert -- $\acute{e}E(F_l)$ --, therefor.

In column 18, line 25, in Claim 18, delete "$1=i=k$" and insert -- $1\leq i \leq k$ --, therefor.

In column 18, line 30, in Claim 18, delete "$r_l, \ldots, r_d$" and insert -- $r_1, \ldots, r_d$ --, therefor.

Signed and Sealed this
First Day of February, 2011

David J. Kappos
*Director of the United States Patent and Trademark Office*